Figure 3:
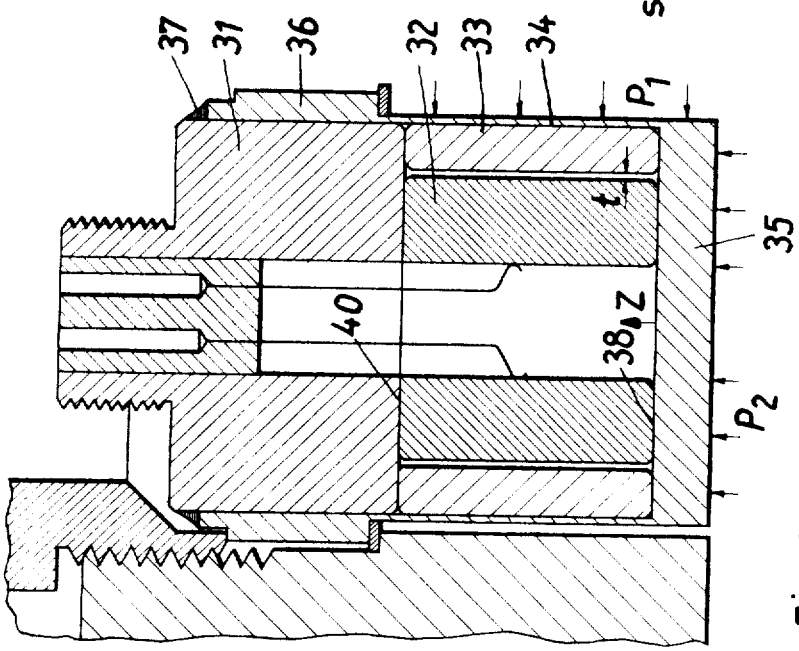

United States Patent
Spescha

[15] 3,672,223
[45] June 27, 1972

[54] PRESSURE TRANSDUCER

[72] Inventor: Gelli A. Spescha, Winterthur, Switzerland
[73] Assignee: Kistler Instrumente AG, Winterthur, Switzerland
[22] Filed: June 19, 1970
[21] Appl. No.: 47,801

[30] Foreign Application Priority Data

June 20, 1969 Switzerland..........................9553/69

[52] U.S. Cl. .................................73/406, 73/398 R, 92/99
[51] Int. Cl. ...........................................................G01l 7/08
[58] Field of Search..................73/398 AR, 406, 133 D, 410; 92/99

[56] References Cited

FOREIGN PATENTS OR APPLICATIONS 424,312  5/1967  Switzerland..........................73/133 D
472,668  6/1969  Switzerland..........................73/133 D

*Primary Examiner*—Donald O. Woodiel
*Attorney*—Craig, Antonelli and Hill

[57] ABSTRACT

A pressure transducer employs a transducer element which is supported on the transducer casing and on a plate which serves as a pressure transmission medium and which is subjected to axial pre-stressing by the provision of an elastic tube spring, which is connected with the transducer casing and the pressure transmitting plate. The tube spring is arranged on a tubular diaphragm which seals the transducer element against the measuring pressure. A support member is also provided against which the tubular diaphragm rests in a radial direction, the support member being arranged between the diaphragm and the transducer element.

12 Claims, 6 Drawing Figures

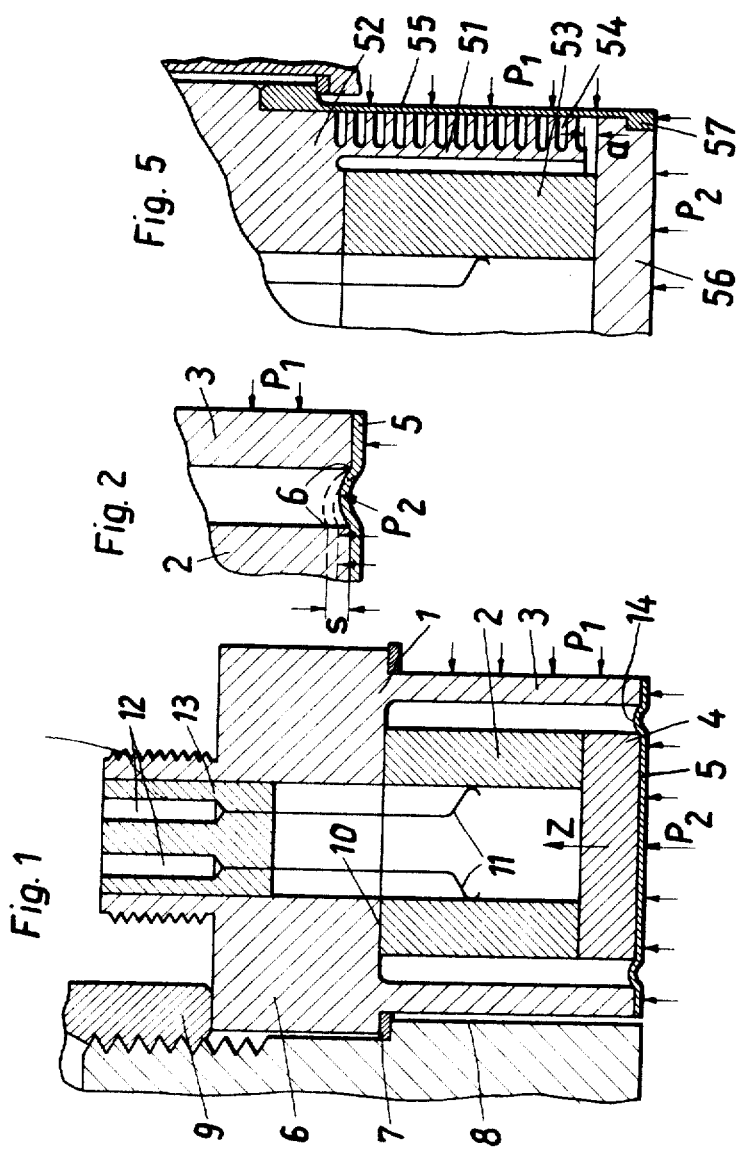

Inventor:
GELLI A. SPESCHA
BY Craig, Antonelli, Stewart + Hill
ATTORNEYS

PRESSURE TRANSDUCER

The application of mechanical/electrical pressure transducers has expanded considerably in the art of measurement and regulation. Thereby the mechanical values of the pressure of gases or liquids whether static or dynamic can be measured at definite points by the fact that an electric signal corresponding to the pressure is evaluated by known methods. Both active and passive types of transducers can be used. The conversion of a pressure into a force to be measured is usually effected by means of a resilient diaphragm in the force-sensitive axis of the transducer. In this case the diaphragm is rigidly connected to the support body and acts directly through a rigidly constructed pressure transmission plate to the force-transducing element in that pressure forces acting on the diaphragm are converted into forces acting only along the sensitivity axis.

High flexure stresses are produced at each pressure change especially for repeated pressure changes, as a result of the necessary axial flexure of the diaphragm. Attempts have been made to reduce these stresses in that the diaphragm has been provided with one or more ring-shaped depressions. Despite these measures the diaphragm is, however, the most strongly stressed component in normal commercial pressure transducers, especially if they are used for high pressure amplitudes and frequencies.

The working life of such pressure transducers is therefore very limited and is generally determined by breakage of the diaphragm. In addition to the danger of permanent breakage of the diaphragm, there is the possibility of deformation of the diaphragm in operation, whereby the bearing point of the diaphragm is displaced and thus the conversion factor pressure force is varied which acts directly on the sensitivity of the pressure transducer. These difficulties are mainly caused by the fact that the electricities of the transducer element and of the transducer casing can be balanced one to the other only with difficulty. In particular, the problem also lies with the fact that radial and axial pressure forces act on the transducer casing beneath the sealing ring, while only axial forces should act on the transducer element.

The invention has for its object the provision of a pressure transducer in which a flat diaphragm sensitive to deformation and flexure is replaced by a tube diaphragm elastic along the sensitivity axis of the transducer. Such a diaphragm is only stressed by variations in the tension stressing along the diaphragm axis, whereby the danger of deformation, especially every flexure stress, is eliminated.

The invention thus refers to a pressure transducer w ith a transducer element which is supported, on the one hand, on the transducer casing and, on the other hand, on a plate serving for pressure transmission and which, under the influence of an elastic tube spring connected with the transducer casing and with the pressure-transmitting plate, is subjected to axial pre-stressing. The invention comprises a tube spring arranged on the tubular diaphragm which seals the transducer element against the measuring pressure and in which the tubular diaphragm rests in the radial direction on a support member arranged between it and the transducer element.

Figure 4:
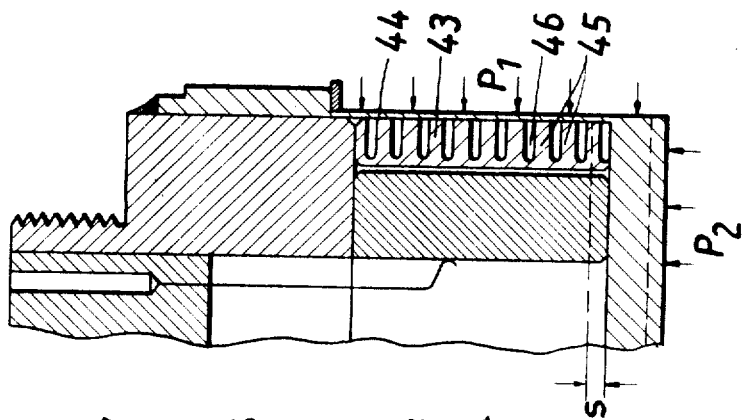
Figure 6:
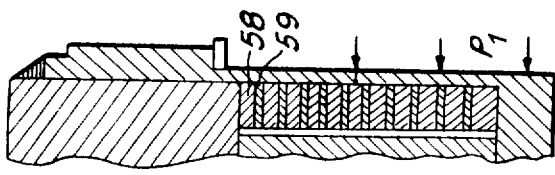

The invention will be further explained by way of example with reference to the drawings wherein:

FIG. 1 shows a section through a commercial pressure transducer with a normal flat diaphragm, FIG. 2 shows a portion of the same pressure transducer with an enlarged view of the deformation of the diaphragm part, FIG. 3 shows a pressure transducer in section according to the invention, FIG. 4 shows a modification of a pressure transducer according to the invention, FIG. 5 shows a further arrangement of a pressure transducer according to the invention; and FIG. 6 shows an additional modification of a pressure transducer according to the invention.

The pressure transducer of usual commercial construction, shown in section in FIG. 1, consists of a transducer casing 1 in which a pressure transducer casing 1 which surrounds the transducer element 2 and screens it from radial pressure P1. The transducer element is covered by a pressure transmitting plate 4 which is connected in turn with a flat diaphragm 5 mechanically by welding or soldering. The surface pressure P2 acting on the flat diaphragm is received by the pressure transmitting plate 4 which is rigidly constructed, and is transmitted as a force component "Z" to transducer element 2.

In order that the transducer element itself is subjected to no radial pressure P1, the flat diaphragm must be firmly connected to the extension 3 of the support casing 1. This is effected usually by welding or soldering. In order that the pressure transducer can be mounted in a corresponding bore, it is provided with a mounting flange 6 which is isolated from the casing bore 8 by means of a sealing ring 7. The clamping force necessary for this purpose is produced by a clamp ring 9. The transducer element 2, constructed in this case as a hollow cylinder, is mounted on the flat clamp surface 10 in the transducer casing 1. Both active and also passive types can be provided as the transducer element. By "active" types of transducers are meant those which produce a measuring signal by the measurement procedure itself, as for example, piezoelectric transducers. By "passive" types of transducers are meant those which modify an impressed voltage as, for example, strain gauge strip transducers. According to the element used the signal off-take 11, sockets 12 are embedded in an insulating mass 13.

For normal installation, the surface pressure P1 compensates the frontal pressure P2. To reduce the bending tension in the flat diaphragm 5, the latter is provided with a depression 14 over the ring chamber between the casing extension 3 and the pressure transmitting plate 4. With such a depression 14, a greater elasticity can be produced in the axial direction.

The flexure of the flat diaphragm 5 is shown on an enlarged scale in FIG. 2. By the action of the frontal pressure P2 the diaphragm is displaced by the amount $s$ since the casing extension 3 and the transducer element 2 are not compressed to the same extent. The difficulty in balancing the two elements for the same compression mass lies with the fact, as already stated, that not only the frontal pressure forces P2, but also the radial pressure forces P1 act on the ring shaped extension 3, while merely the resulting force acts on the transducer element in the axial direction. As a result of the difficulty in adapting these two elements one to the other, there are always obtained axial deformation differences $s$ which adversely affect the working life of the flat diaphragm 5. Since, moreover, the bearing point 6 of the flat diaphragm can be displaced as a result of this deformation, there is the danger that alterations in the sensitivity of the pressure transducer may occur.

The transducer according to the invention is shown in section in FIG. 3 and comprises a casing 31 having an easily machined bearing face 40 on which the transducer element 32 is supported. The transducer element can be of the active or passive type and in the example shown is in the form of a ring body with parallel end faces. A ring-shaped body 33 of the same axial length as the element 32 is arranged around the transducer element 32 in such manner that radial clearance $t$ is left between the two of them. Thereby, the result is obtained that the transducer element 32 cannot in any way be influenced by the ring body 33 by forces acting on its peripheral surface.

Advantageously, the transducer element 32 and the ring body 33 are simultaneously machined flat on their end faces. A tubular diaphragm 34, resilient along its longitudinal axis, rests on the ring body 33 and may be formed in one piece with the pressure transmitting plate 35 and the mounting flange 36. The ring-shaped body 33, thus operates as a support member for the tubular diaphragm. The bell-shaped unit is subject to a predetermined mechanical prestress and the flanged part 36 is rigidly connected by welding or a similar joint 37 to the transducer casing 31. In this way springing action between the transducer element, the pressure transmitting place and the transducer casing is largely avoided.

By the omission of the flat diaphragm, the pressure transmitting plate 35 can be arranged directly as a closure means, relative to the pressure medium, and hence, according to the purpose of application, a suitable material is chosen. Generally, care is taken that this plate has as small a mass as possible, that is to say, it is produced from material of low specific weight. On the other hand, the plate must be as rigid as possible in order that the surface pressure P2 acting on it shall cause the minimum possible deflection on the bearing faces 38 of the transducer element and that further, the plate shall transmit to the transducer element a force Z which is directed along the axis as accurately as possible.

The force Z is transmitted partially to the transducer element and partially to the ring body, according to the elasticity and dimension relations of the transducer element 32 and the ring body 33. By the elastic or resilient formation of the ring body, the result can be obtained that almost the whole force Z is transmitted to the transducer element. The main function of the ring body 33 is to absorb the radial forces P1 received by the tubular diaphragm 34 without transmitting them to the transducer element 32. The construction should, however, be such that no disturbing transverse deflections appear by reason of these radial forces, which could influence the measurement signal of the transducer element.

The elastic yield produced by the frontal forces P2 is absorbed both by the transducer element and by the ring body and is compensated by the elastic tube spring. The changes in length of the tube spring 34, as a result of varying forces produced in this way, produce no bending forces thereon, but only a variation in the predetermined longitudinal tension. The tube spring can, therefore, absorb far greater changes in shape since the whole length of the elastically constructed part can be utilized for this purpose. The stress is thus converted from a bending stress, as is present in the diaphragm sealing according to FIG. 1, into a pulsating tensional stressing in which, as a result of the far greater deflection lengths, a much smaller specific stressing is obtained than with a flat diaphragm designed for similar conditions in which there is only a very limited scope for a relatively large change in shape. The working life of such a tubular diaphragm is therefore many times higher than for a flat diaphragm. Furthermore, the rigid transmitting plate 35 has also the advantage that it produces no changes in the bearing points during deflection and thus the response does not vary with the pressure.

FIG. 4 shows a modification of the construction according to the invention in which the ring body 43, constructed as a pressure ring is made substantially more elastic in the axial direction by means of depressions 46. In this way the elasticity is less varied in the radial direction. This feature has the further advantage that any movement produced by the deflection s between the tube diaphragm 44 and the pressure ring 43, is absorbed by deflection of the individual rings 45. In this way, all possible mechanical friction between the elastic tubular diaphragm and the pressure ring is avoided. It is, however, also immediately possible to construct the pressure ring 43 from a plurality of discs (see FIG. 6), instead of in one piece, which are provided with suitably chosen intermediate rings. In this way the longitudinal elasticity of the pressure ring element can be adapted to a large extent to local requirements.

A further modification of a pressure transducer according to the invention is shown in FIG. 5 in which the ring body 51 is formed in one piece with the transducer body 52, in the same way as the transducer in FIG. 1. Depressions 54 are also provided to further increase the longitudinal elasticity but especially to avoid friction relatively with the tubular diaphragm 55. The ring body 51 can extend up to the pressure transmitting plate 56, whereby it participates in the force path due to the frontal forces P2. It can, however, also be shorter so that a clearance $a$ is left from the pressure transmitting place 56, whereby it must then absorb only the radial forces caused by the pressure forces P1. This solution has the great advantage that the mass of the ring body 51 only acts to an insignificant extent for increasing the acceleration sensitivity of the transducer.

In this case, a separate construction of the pressure transmitting plate 56 and the tube diaphragm 55 is shown as an example, wherein the latter is provided with a ring-shaped rim 57. In this way it is possible to form the pressure transmitting plate 56, for example, of a ceramic or glass-like material, while the tube diaphragm 55 can be made, for example, from metal or also from a glass or ceramic like material. FIG. 6 illustrates an additional variation of the instant pressure transducer wherein, instead of the single ring body, a plurality of discs 58, separated by intermediate rings or spacers 59 are provided. As previously noted, the pressure ring element is thus given additional longitudinal elasticity.

The problem of frictional effects between the tube diaphragm 34 and the ring body 33 can also be eliminated by the fact that the operative axial length of the tube diaphragm 34 is made the same as that of the ring body 33. In this way the transducer element 32, the ring body 33 and the tube diaphragm 34 execute equal elastic movements so that no friction can be produced. In applications where, as far as possible, equal axial heat expansion and elasticity of piezoelectric arrangement of the crystals and of the ring body are required, it is desirable to form the latter also of the piezoelectric crystal material.

The invention so far described thus represents a considerable advance in the field of pressure transducers. The replacement of the usual flat diaphragm by an elastic tube diaphragm, which can be supported in the radial direction on a ring body, provides the possibility that the pressure transducer element can be subjected to a flat parallel loading wherein also the rigid construction of the pressure transmitting plate produces no change in the pressure bearing point even for deflection under high pressure action. It offers, however, also the possibility of fulfilling two quite different requirements of forming the pressure transmitting plate and the elastic tube diaphragm according to desired requirements. Thus, for example, the pressure transmitting plate can be constructed of a very rigid plate which is as light as possible and with the smallest possible coefficient of expansion and the smallest possible conductivity, while the elastic tube diaphragm can be produced of steel with good elasticity properties. The connection of the two elements can be obtained both by a thick collar part or, according to recent methods, by means of hard soldering. Also, the pressure transmitting plate can be produced, for example, from a ceramic material and the elastic tube diaphragm from an elastic nickel steel. It is, however, also possible to produce the whole unit, for example, from moulded quartz glass. Pressure transducers according to the invention are constructed in the same way as commercial types as regards the installation arrangements and the signal take-off means.

The invention being thus described, it will be obvious that the same may be varied in many ways. Such variations are not to be regarded as a departure from the spirit and scope of the invention, and all such modifications as would be apparent to one skilled in the art are intended to be included.

What I claim is:

1. A pressure transducer comprising a casing, a plate serving for pressure transmission, a transducer element supported by said casing and said plate, an elastic tubular diaphragm connected to said casing and said plate and sealing said transducer element against the measured pressure, said elastic tubular diaphragm subjecting said transducer element to axial prestressing, and a support member positioned between said elastic tubular diaphragm and said transducer element.

2. A pressure transducer according to claim 1, characterized in that said support member is a ring body which surrounds said transducer element in the manner of a ring.

3. A pressure transducer according to claim 2, characterized in that said ring body is clamped between said pressure transmitting plate and said transducer casing and is under axial pre-stressing pressure produced by said tubular diaphragm.

4. A pressure transducer according to claim 1, characterized in that said support member is constructed to prevent radial stresses from acting on said transducer element.

5. A pressure transducer according to claim 1, characterized in that said elastic tubular diaphragm, said pressure transmitting plate and its mounting flange are formed in one piece.

6. A pressure transducer according to claim 1, characterized in that the ring body included projecting elements distributed around its outer peripheral surface, on which said tubular diaphragm bears.

7. A pressure transducer according to claim 6, characterized in that the projections are formed as ribs extending in the peripheral direction of the ring body.

8. A pressure transducer according to claim 1, characterized in that the pressure transmitting plate consists of a rigid material having a lower heat conductivity and a lower specific weight than the casing.

9. A pressure transducer according to claim 1, characterized in that the transducer element consists of a piezoelectric element and that the support member is formed of a piezoelectric crystal material.

10. A pressure transducer according to claim 2, characterized in that the ring body consists of individual discs placed one on the other and between which spacing means can be inserted.

11. A pressure transducer according to claim 1, characterized in that the effective axial length of the tubular diaphragm is the same as the axial length of the ring body.

12. A pressure transducer according to claim 1, characterized in that the support member and the tube diaphragm are formed in one piece.

* * * * *